United States Patent Office

3,629,138
Patented Dec. 21, 1971

3,629,138
METHOD FOR EXCHANGING COUNTERIONS IN ACTINIDE OXIDE SOLS
Iran L. Thomas, Oak Ridge, Tenn., assignor to the United States of America as represented by the United States Atomic Energy Commission
No Drawing. Filed Oct. 16, 1969, Ser. No. 867,095
Int. Cl. C09k 3/00
U.S. Cl. 252—301.1 S        4 Claims

ABSTRACT OF THE DISCLOSURE

There is provided a method for exchanging counterions, such as nitrates and chlorites, in acidic metal oxide sols comprising contacting a nitrate-stabilized metal oxide sol with carbon dioxide, removing the released nitrate and contacting the carbon dioxide-stabilized colloidal system with a chloride-containing solution to form a chloride-stabilized metal oxide sol.

BACKGROUND OF THE INVENTION

The invention described herewith was made in the course of, or under, a contract with the U.S. Atomic Energy Commission. It relates generally to methods for preparing metal oxide sols and more particularly to a novel method for exchanging the stabilizing counterions in such sols.

Heretofore, various methods have been employed in the preparation of metal oxide sols. Of the many metal oxide sols the actinide metal oxide sols are of particular interest since they are useful in the preparation of nuclear reactor fuels. Typical examples of these sols are the oxides of thorium, uranium, plutonium and mixtures thereof. Actinide metal oxide sols have been prepared by precipitation-peptization of hydrous oxide precipitates, electrodialysis, autoclaving of selected salt solutions and solvent extraction processes, to name only a few. These methods have been employed to provide sols stabilized with various counterions, e.g., nitrate, formate, chloride, etc., and/or mixtures thereof. While these methods have been quite successful in preparing a particular counterion-stabilized metal oxide sol the only known way to change the stabilizing counterions was by conventional ion exchange techniques. Accordingly, where the metal oxide sol was prepared as a nitrate-stabilized sol, the sol is passed through an ion exchange containing a suitable anion exchange resin, such as CG-400 (a chromatographic strong base anion exchange resin, chemical type polystyrene divinyl benzene alkyl quaternary amine), to convert it into the chloride-stabilized form. Positive ions, which if present may cause gelation, may be removed by ion exchange. It is desirable and an object of this invention to provide a method for converting metal oxide sols from one stabilized system to another without the costly ion exchange process which necessitates solids handling and separation steps and which does not readily retain the sol in a fluid state, i.e., free from gelation in the presence of a solid phase, precipitation or dissolution of the solid phase. Another object of this invention is to provide a method for the preparation of metal oxide sols wherein the sols may be formed from readily available feed solutions, e.g., uranyl solutions as eluate streams from nuclear reprocessing plants and converted into a form which has improved shelf life, e.g., a chloride-stabilized form.

SUMMARY OF THE INVENTION

The objects of this invention are achieved by the discovery that acidic metal actinide sols can be caused to reversibly sorb carbon dioxide with displacement of the counterions adsorbed on the colloidal particles. In one embodiment of the invention carbon dioxide gas was bubbled through a nitrate-stabilized urania sol at atmospheric pressure and at room temperature to form an intermediate carbon dioxide-stabilized urania sol by sorption of the carbon dioxide on the urania crystallites. Thereafter nitrate ion was removed by solvent extraction and the resulting colloidal system contacted with chloride ion to form a chloride-stabilized urania sol. A nitrate-stabilized urania sol (1.375 M $UO_2$, 0.101 M $NO_3^-$, 0.46 $HCOO^-$) was converted to a chloride-stabilized sol with 1 M HCl having a chloride concentration of 0.02 M and a nitrate concentration of 0.0034 M.

DESCRIPTION OF THE PREFERRED EMBODIMENT

While the method of this invention is broadly applicable to exchanging counterions in any acidic metal oxide sol, the invention will be described with particular reference to a nitrate-stabilized urania sol which is processed, in accordance with the method of this invention, into a chloride-stabilized urania sol. It will be understood here that the conversion of a chloride-stabilized urania sol to a nitrate-stabilized urania sol is also within the scope of the present invention.

The preparation of the urania sol forms no part of this invention. One method for preparing a stable urania sol is disclosed in S.N. 814,311 filed on Apr. 8, 1969, in the names of John P. McBride et al. for "Production of Predominantly Crystalline Sols." There a uranium-containing solution—1.3 M uranium (IV), 2.6 M $NO_3^-$, and 0.6 M $HCOO^-$ was extracted with 0.25 M solution of N-lauryltrialkylmethylamine (M.W.~365) in a diluent comprising 75% diethylbenzene-25% n-paraffin at a crystallizing temperature of about 60° C., the rate of nitrate removal being at a rate which approximated the release of free acid to the aqueous phase. The resulting sol was further extracted with an amine to a desired nitrate/uranium mole ratio, such as 0.1.

In carrying out the first step of the present invention the nitrate-stabilized urania sol is contacted with carbon dioxide. It is preferred that is step be effected by bubbling carbon dioxide gas through the sol at atmospheric pressure and at room temperature. The carbon dioxide should be bubbled through the sol until it is saturated. This insures completeness of the carbon dioxide sorption on the urania crystallites and release of nitrate ions. While the exact nature of this intermediate sol is not known, it is assumed that carbonate or bicarbonate ions replace nitrate ions on the surface of the urania crystallites.

The intermediate sol is next contacted with a liquid ion exchange reagent to remove nitrate ions. It is preferred that the nitrate be extracted with an immiscible amine selected from primary, secondary, or tertiary amines having at least 10 carbon atoms in the molecule. A suitable amine is N-lauryltrialkylmethylamine (M.W.~365). The amine may be diluted with a suitable organic diluent, such as diethylbenzene; and where such a diluent is used, a suitable extractant is one part by volume amine and two parts organic diluent. The nitrate is extracted until the amount of nitrate remaining in the product is at the desired level. Multiple extraction stages may be used to enhance nitrate removal. At this point the sol forms a soft gel or a thick sol, depending upon the initial concentrations of the metal oxide. As the metal oxide concentration in the feed solution decreases, the tendency to form soft gels decreases. It will be understood here that the term "colloidal system," as used herein, has reference to either a soft gel or a thick sol produced by removal of the nitrate ions from the intermediate sol.

After the nitrate is removed the colloidal system is converted to a chloride-stabilized system. Applicant found, quite unexpectedly, that a fluid chloride-stabilized sol could be regenerated from the gel by merely adding chloride ion in the form of hydrochloric acid to the gel. The amount of chloride ion added must be sufficient to form a stable sol. It is important to note that the amount of counterion added may be adjusted at will which is a distinctive and important advantage of this method over the ion exchange method where the amount of replacement ion is not under direct quantitative control. When the sol does undergo gelation upon removal of nitrate the gel must be mechanically mixed while adding the hydrochloric acid but no difficult solid separation step is required, as for example, if ion exchange resin beads were used to remove the nitrate. The gel is sufficiently mobile to permit mixing at low rate of shear ($\sim 100$ sec.$^{-1}$). The carbon dioxide is removed after refluidization by sparging with an inert gas. It will be noted here that the present invention may be carried out batch-wise or on a continuous basis. Where the process is operated on a continuous basis, additional solids-handling equipment may be required.

The counterion exchange is conducted at room temperature and atmospheric pressure. However, it will be obvious to those skilled in the art that other temperatures and pressures may be employed within the scope of the present invention.

The feasibility of effecting counterion exchange of a nitrate-stabilized sol to a chloride-stabilized sol is demonstrated in the following example.

EXAMPLE

Two 50-ml. samples of urania sol—1.375 M $UO_2$, 0.101 $NO_3^-$, 0.46 M $HCOO^-$—prepared by the method described in the McBride et al. application were sparged with carbon dioxide for about 5 minutes. The sols were subsequently contacted with shaking with 200 ml. of an amine extractant comprising one part by volume of Amberlite LA-2 (N-lauryltrialkylmethylamine) and 2 parts diethylbenzene. The amine extractant removed nitrate, causing the aqueous phase to form a soft gel after about 10 minutes. The extractant was removed by decantation and chloride ion added in the form of 1 M HCl. The gels refluidized to become sols and the carbon dioxide was removed by sparging with argon. The chloride concentration in the final sol was 0.02 M and the nitrate was 0.0034 M.

It may readily be seen that carbon dioxide was reversibly adsorbed on the urania crystallites and that essentially all of the nitrate ion originally present as the stabilizing ion was removed (97% removed) and replaced with chloride ion.

What is claimed is:

1. A method for exchanging counterions in acidic actinide oxide sols, said metal being selected from the group consisting of uranium, thorium, plutonium, or mixtures thereof, comprising the steps of contacting a metal oxide sol stabilized with a first counterion with carbon dioxide to form an intermediate carbon dioxide-stabilized sol, removing said first counterion by contacting said stabilized sol with a liquid ion exchange reagent, and thereafter contacting the resulting colloidal system with a second counterion whereby said metal oxide sol is stabilized with said second counterion.

2. The method of claim 1 wherein said actinide metal oxide is urania.

3. The method of claim 1 wherein said first counterion is nitrate and said second counterion is chloride.

4. The method of claim 1 wherein said ion exchange reagent is an immiscible amine.

References Cited

UNITED STATES PATENTS 2,733,205    1/1956    Dalton et al. ____ 252—301.1 X

CARL D. QUARFORTH, Primary Examiner

R. L. TATE, Assistant Examiner

U.S. Cl. X.R.

23—340, 355; 252—313 R